United States Patent [19]
Berthet et al.

[11] 4,134,037
[45] Jan. 9, 1979

[54] CURRENT LEAD-IN DEVICE FOR SUPERCONDUCTING ROTARY ELECTRICAL MACHINES

[75] Inventors: Michel Berthet, Gif sur Yvette; Roger Gillet, Belfort; André Marquet, Paris; François Moisson-Franckhauser, Bretigny sur Orge, all of France

[73] Assignees: Alsthom-Atlantique; Electricite de France - Service National, both of Paris, France

[21] Appl. No.: 846,225

[22] Filed: Oct. 26, 1977

[30] Foreign Application Priority Data

Oct. 28, 1976 [FR] France ................................ 76 32548

[51] Int. Cl.² ............................................. H02K 9/00
[52] U.S. Cl. ........................................ 310/52; 310/10; 310/71; 62/514 R; 174/15 CA
[58] Field of Search ....................... 310/10, 40, 71, 52, 310/64; 62/514 R, 55; 335/216; 336/DIG. 1; 174/15 CA

[56] References Cited

U.S. PATENT DOCUMENTS

| | | | |
|---|---|---|---|
| 3,581,512 | 6/1971 | Staas | 62/514 R |
| 3,654,377 | 4/1972 | Fleming | 174/15 CA |
| 3,809,933 | 5/1974 | Sugawara | 310/10 |
| 4,079,273 | 3/1978 | Lambrecht | 310/52 |

*Primary Examiner*—R. Skudy
*Attorney, Agent, or Firm*—Sughrue, Rothwell, Mion, Zinn and Macpeak

[57] ABSTRACT

A current lead for a superconducting rotary machine is constituted by a copper tube having a superconducting conductor fastened (e.g. by soldering) to a portion of its length, the entire length of the tube having copper cooling plates each of which blocks the bore of the tube leaving only a small hole for the passage of gaseous or hypercritical helium. The current lead is particularly applicable to the generation of electric power using cryoalternators.

8 Claims, 4 Drawing Figures

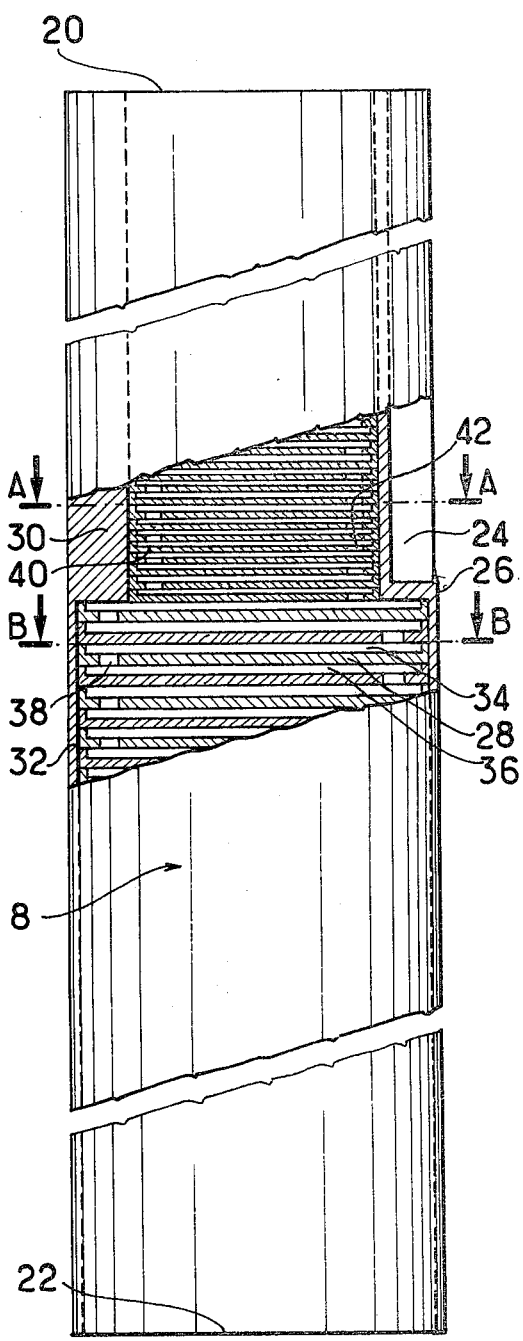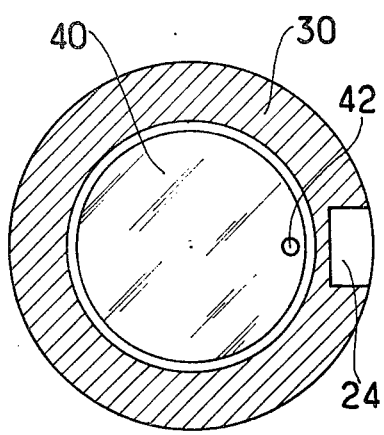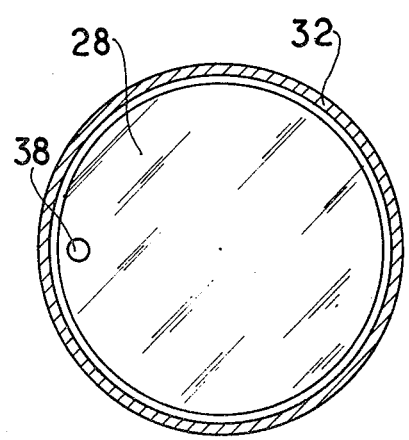

CURRENT LEAD-IN DEVICE FOR SUPERCONDUCTING ROTARY ELECTRICAL MACHINES

FIELD OF THE INVENTION

The invention concerns a current lead for superconducting rotary electrical machines. The function of such a device is to provide an electrical connection between a supply terminal at ambient temperature and one end of a superconductive conductor which requires as little cooling as possible to keep the end of the superconductor at a very low temperature, in spite of the heat input from the current lead.

BACKGROUND OF THE INVENTION

The cooling power required to do this is the mechanical or electrical power required by the cooling devices, such as helium liquifiers, for example, needed to keep the superconductors at their operating tempeatures. The invention is particularly suited to machines in which the superconductors are cooled to a temperature at which their superconductivity is maintained by means of a cryogenic fluid such as helium passed through cooling circuits. After passing through the machine, this fluid, or part of it, may be used for cooling the current leads. If all the cooling fluid is used, its flow rate depends on the requirements of the machine, and cannot be modified to take account of the specific requirements of the current leads.

SUMMARY OF THE INVENTION

The present invention provides, in one aspect, a current lead for superconducting rotary electrical machines comprising a mixed section including a superconductive conductor in thermal and electrical contact with a normal conductor.

A normal section includes a normal conductor continuous with the normal conductor of the mixed section.

A system is provided for circulating a cooling gas through said mixed section so as to cool it to a temperature compatible with superconductivity and then over said normal section to prevent excessive transfer of heat from the normal section to the mixed section.

Fins are provided for increasing the area of the lead in thermal contact with the cooling gas, and a tube of a material which is a good conductor of heat and electricity.

A superconductive conductor is fastened to the tube in good thermal and electrical contact with the tube and extends along it from a cold end of the tube to an intermediate point. This section of the tube constitutes said mixed section of the device and the remaining section of the tube constitutes said normal section of the device, which provides a zone of thermal transition between the intermediate point and a hot end of the tube.

A series of plates are contained within the tube and substantially perpendicular to the tube axis. The plates fill the tube so as to define a series of flat chambers between adjacent plates, each of which comprises a hole enabling the cooling gas to flow from the cold end of the tube to the hot end through the series of chambers, the gas passing from one chamber to the next via the hole in the plate separating the two chambers.

In another aspect, the present invention provides a rotor for a superconducting rotary machine comprising superconductive winding subject to high-intensity, variable magnetic fields.

Two normal conductors are provided for conveying current to said superconductive winding.

Two current leads are provided for effecting the transfer of current between the normal conductors and the superconductive winding, each of the leads having a cold end adjacent the superconductive winding and a hot end adjacent the normal conductor.

A system is provided for introducing a pressurised cooling fluid into the rotor and circulating it over the superconductive winding and the current leads with the fluid passing from the cold end of said leads to the hot end.

Each current lead is in the form of a tube of a material which is a good conductor of heat and electricity, a "mixed" section of the tube extends from the cold end to the hot end thereof and has fastened to it a superconductive conductor in good thermal and electrical contact with the tube, the remainder of which constitutes a "normal" section thereof.

A series of plates are contained within the tube and are substantially perpendicular to the tube axis, the plates filling the tube so as to define a series of flat chambers between adjacent plates, each of which comprises a hole enabling the cooling gas to flow from the cold end of the tube to the hot end through the series of chambers. The gas passes from one chamber to the next via the hole in the plate separating the two chambers and a pressure drop occurs as the fluid passes through said hole.

This is a different situation from that of conventional current leads used for the electrical supplies of superconducting devices bathed in liquid helium in a cryostat. These current leads, which dip into the cryostat, are cooled by the flow of gaseous helium resulting from the evaporation of the liquid helium. The cooling effect is sometimes improved by fitting transverse metal fins. As an increase in the electrical current results in increased $I^2R$ loses, the heat input to the cryostat from the current leads also increases, which increases the rate at which the liquid helium evaporates, which increases the cooling effect on the current leads. There is thus a self-compensating effect which tends to reduce fluctuations in the temperature of the current leads. There is no self-compensating effect with the current leads in accordance with the invention, which are cooled by a fluid in the vapour or hypercritical phase fed to the cold end at a rate imposed by the operating conditions of the machine.

In conventional current leads and in current leads in accordance with the invention it is possible to distinguish two successive zones with progressively increasing temperatures. These zones are:

(a) a cold zone, in which a superconductive conductor is in good thermal and electrical contact with a "normal" metal conductor, i.e., one without superconducting properties but with good thermal and electrical conductivity, such as copper or pure aluminium, and in which the temperature is always low enough to support superconductivity; and (b) a transition zone, with only a normal conductor, and in which the temperature increases progressively from a low value adjacent the cold zone to ambient temperature, which will hereinafter be referred to as "hot".

A major problem in the design of a current lead is selecting the cross-section of the normal conductor in the transition zone. If the cross-section is too small there will be excessive $I^2R$ losses which will generate large amounts of heat to be removed by the cooling fluid. If the cross-section is too large, however, too much heat will be conducted along the normal electrical conductor, from the hot zone to the cold zone, and this too will have to be removed by the cooling fluid. A minimum value of the sum of these two quantities of heat, and thus a minimum value of the cooling power needed to remove it, corresponds to an optimum value of the cross-section, and is substantially proportional to the length of the transition zone. It is inadvisable to depart to too great an extent from the optimum value of the ratio of the cross-section of the normal conductor to the length of the transition zone. The length of the current lead cannot be reduced to any desired value, as it is within this length that the total quantity of heat mentioned above must be transferred to the cooling fluid. It is to limit this length that fins have been fitted to current leads dipping into cryostats. These fins increase the rate at which heat is transferred from the current lead to the cooling fluid. The transfer of heat is an even more critical problem in the case of current leads in accordance with the invention because, as there is no liquid bath at the lower end, the temperature of the fluid begins to rise as soon as it receives any heat, which reduces its capacity for removing heat from the current lead.

The current leads in accordance with the invention are fed at the cold end with gaseous or hypercritical helium drawn from the rotor cooling circuit. The flow rate is set by means of an expansion valve located downstream of the current lead and opening into the circuit for recovering the helium at ambient temperature. Unlike conventional current leads, the amount of heat conducted to the cold end along the current lead in accordance with the invention is practically zero.

For a given value of the current fed to a current lead in accordance with the invention, with a conductor of fixed cross-section, there is a threshold value for the helium flow rate below which part of the cold zone will fail to remain at a superconductive temperature. Thus it is possible to define a minimum flow rate for the maximum current such that the temperature of the mixed section will remain low enough for superconductivity to be obtained, the length of this mixed section being sufficient to permit transfer of current between the superconductor and the normal conductor to which it is welded.

Another serious problem occurs in the case of current leads for superconducting rotary machines. In the rotor of such a machine, centrifugal force causes variations in the pressure and temperature in the cooling fluid, depending on its distance from the rotor axis. The isotherms in the helium tend to stabilise as coaxial cylinders, the temperature and density increasing from the centre towards the outside. If the superconducting machine is stopped for a short period, the current leads must be effectively cooled to evacuate heat conducted from the hot end, whatever the angular position of the rotor. This means that free convection currents due to gravity must be eliminated. The differences may be considerable if the cooling fluid is a gas such as helium, and they favour the creation of convection currents which impede proper cooling of certain parts of the current leads. The cooling gas in some areas may flow at a much reduced velocity, or even in the opposite direction to the general flow of the gas. These factors indicate the use of radially arranged current leads, but this is not a practical solution in the case of rotary machines.

Preferred embodiments of the present invention provide a current lead for rotary electrical machines which is of simple design, compact, consistent with low levels of cooling power and capable of installation in any direction relative to the rotor axis, and especially parallel to that axis.

An embodiment of the invention will now be described, by way of non-limiting example only, and with reference to the accompanying diagrammatic drawings, in which:

BRIEF DESCRIPTION OF THE DRAWING

FIG. 2 is an axial cross-section through one of the current leads of the rotor shown in FIG. 1, the superconductive and normal conductors not being shown in this figure;

FIG. 3 is a cross-section through the current lead shown in FIG. 2, on the plane A—A which is perpendicular to the axis of the lead and passes through the "mixed" section thereof; and FIG. 4 is a cross-section through the current lead shown in FIG. 2, on the plane B—B which is perpendicular to the axis of the lead and passes through the "normal" section thereof.

Parts common to more than one figure have the same reference numeral in all figures in which they appear.

DESCRIPTION OF THE PREFERRED EMBODIMENT

Figure 1:
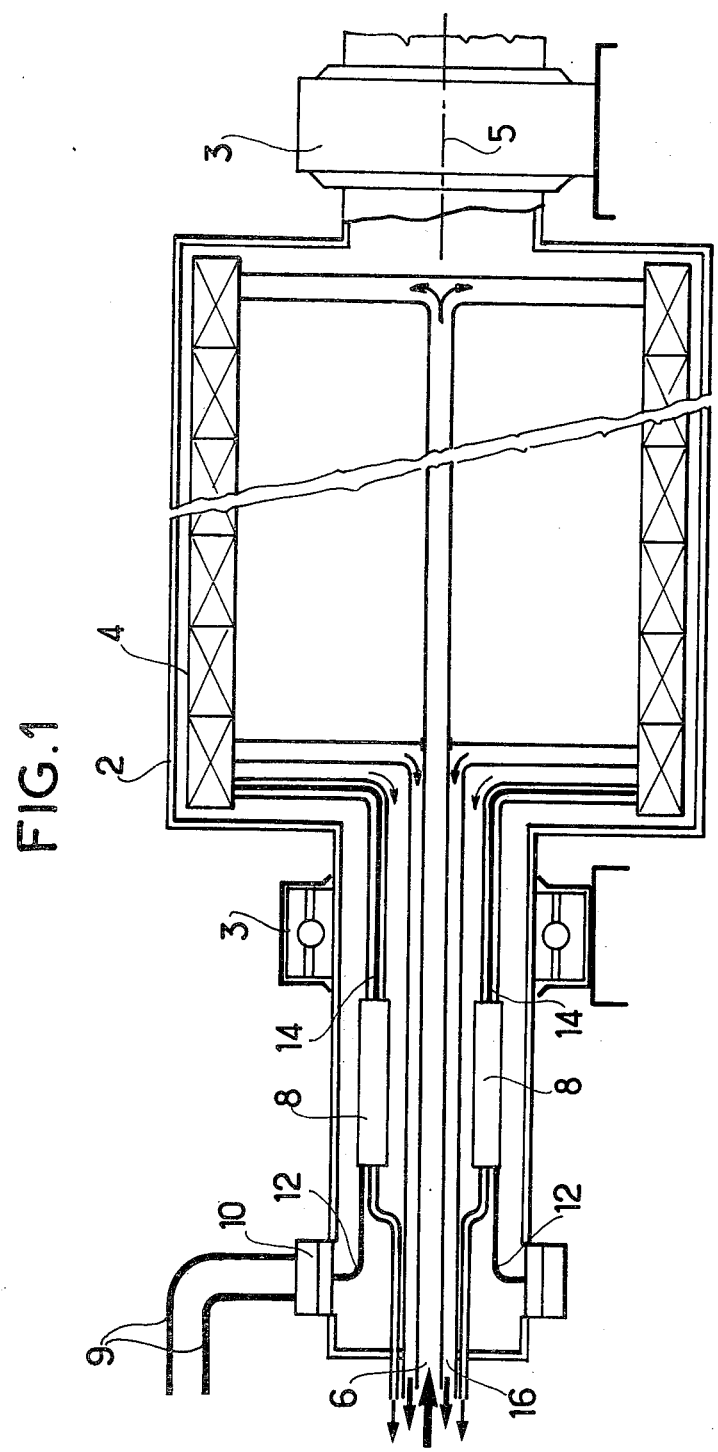
FIG. 1 is an axial cross-section through a cryogenic alternator rotor comprising current leads for rotary electrical machines in accordance with the invention.

Referring to FIG. 1, the current lead to be described hereinafter may be used for supplying electrical power to the rotor 2 of a cryogenic alternator. The rotation axis of the alternator is indicated at 5. The rotor is supported by bearings 3, and the windings 4 consist of multifilament superconductors made of niobium-tin ($Nb_3Sn$) or niobium-titanium (NbTi) filaments embedded in a copper matrix. The electrical current passed through the windings 4 is lead in through fixed conductors 9, brushes 10 and sliprings 12, and may have a value of several thousand amperes. The windings are cooled by a flow of helium introduced into the rotor through an axial conduit 6. The helium is at a temperature in the region of 4° K and at a pressure of 1 to 10 bars. A flow of approximately 1 g/s of helium is diverted from the helium for cooling the windings, and is used to cool the current leads 8 which connect the normal conductors 12 to the superconductors 14. The terms "upstream" and "downstream" used hereinafter refer to the direction of flow of the helium for cooling the current leads, the temperature of the helium increasing as it travels from the upstream to the downstream end of its path.

The helium leaving the current leads 8 is at a temperature close to ambient temperature, and is recovered in a separate chamber (not shown) which surrounds the rotor shaft and is isolated from the atmosphere by conventional rotary seals.

FIG. 2 shows one of the current leads 8 to a larger scale. It has a cold (upstream) end 20 which is connected to the superconductor 14 (FIG. 1), and incorporates a passage (not shown) through which is passed helium drawn from the windings 4 and already used to cool the superconductor 14. The current lead 8 has the general form of a cylindrical tube and is made of copper, which is a good conductor of heat and electricity. The helium enters the tube at the cold end and flows through to its hot end 22, which it leaves at a temperature close to ambient temperature.

The superconductor 14 is fastened in a groove 24 in the outer surface of the tube 8, but it could alternatively be welded in. The groove 24 extends parallel to the tube axis, over a portion of its length referred to in this specification as the "mixed" section, because in this section the electrical current is carried both by the tube 8 and by the superconductor 14 welded into the groove 24. In the mixed section, the wall 30 of the tube 8 is relatively thick, so that the longitudinal flow of electrical current generates only low $I^2R$ losses. This arrangement, in combination with the use of discs with the same configuration as those to be described below in relation to the "normal" section of the tube, provides a substantially uniform temperature throughout the mixed section which is low enough to maintain superconductivity in the superconductor 14 connected to it. The length of the mixed portion is sufficient to enable current to pass transversely through the wall of the tube 8 and the soldering into the superconducting filaments of the superconductor 14 without excessive heat generation and in spite of the resistive walls of the superconductor.

The remainder of the tube 8 constitutes the "normal" section of the current lead, extending to the "hot" end 22 to which the normal conductor 12 is connected.

The thickness of the wall 32 of the tube 8 in the normal section is such as to minimise the heat input at the intermediate point 26 which constitutes an interface between the mixed and normal sections of the current lead. This heat input results from two causes. One is thermal conduction from the hot end 22 to the intermediate point 26. The other is the generation of heat by the $I^2R$ losses due to the passage of the electrical current. If the wall is too thin, the heat generated by these $I^2R$ losses will be too great, but if the wall is too thick, the amount of heat input due to thermal conduction will be too great. For a given length of current lead, the optimum thickness depends on the effectiveness of the cooling system and on the value of the current. It is advantageous if the wall thickness in this normal section is less than that in the mixed section. From the point of view of reducing the cooling power requirements, it is advantageous to maximise the lengths of the mixed and normal sections, but these lengths are obviously limited by the space available in the machine.

The cooling of the normal section of the tube 8 is improved by filling it with discs 28 of the same material, these discs having the same area as the internal cross-section of the tube, but each being formed with a hole 38. There are similar discs 40 in the mixed section, but the discs 28 and 40 are not the same size. The discs are flat and perpendicular to the longitudinal axis of the tube. They form a series of chambers 34 and 36 separated from one another by one of the discs. The helium passes from the "upstream" chamber 34 to the "downstream" chamber 36 via the hole in the disc between the two chambers. Each of the chambers is defined by two of the discs and by the inside wall of the tube 8. The distance between adjacent discs is sufficiently large to produce a substantially uniform pressure in each chamber, the pressure dropping to a significant extent on each passage through a hole in one of the discs. This avoids the creation of unwanted gaseous convection currents. The diameter, number and separation of the discs are selected to ensure a large surface area in contact with the helium and a mean tangential helium flow rate resulting in a good heat transfer coefficient and a limited difference in temperature between the helium and the walls of the tube.

The holes in the discs are sufficiently small to prevent any alternating flow of helium due to free convection within the holes. As a result, the temperature of the helium in the chambers defined by the discs is staggered along the length of the tube.

The discs must not be too thick, as this would limit the surface area in contact with the helium by reducing the number of discs. They must not be too thin, however, as heat must be transferred from the tube walls to the central portion of each disc.

The following dimensions are in arbitrary units, to indicate the relative sizes of the various sections of the device. In a typical machine these dimensions might be expressed in millimeters:

|  | Mixed section | Normal section |
| --- | --- | --- |
| Total length | 200 – 500 | 500 – 1500 |
| Outside diameter of tube 8 | 50 – 100 | 50 – 100 |
| Wall thickness of tube 8 | 10 – 20 | 1 – 2 |

Experience has shown that it is advantageous if the area of the holes is from 0.5 to 5.0% of the area of the disc in which they are formed, and if the axial length of the chambers 34 and 36 is between 1 and 10% of their diameter (or of the transverse dimension in the case of a non-cylindrical tube 8 with non-circular plates rather than discs as in this example).

FIG. 3 shows a disc 40 with its hole 42, as fitted to the mixed section of the current lead. FIG. 4 shows a disc 28 with its hole 38, as fitted to the normal section.

The holes 38 and 42 near the rims of the discs are preferably disposed on alternate sides of the rotor axis 5, so as to force the helium to flow across the chambers 34 and 36 in a direction perpendicular to that axis.

The current lead may be made by assembling the discs and spacing rings inside the tube and welding the whole together by electron bombardment from the outside of the tube, or by brazing.

The material used may be copper or a copper alloy.

As the device comprises a current lead for the input of current and another for the output of current, and helium inlet and outlet conduits, it is convenient to arrange the two current leads symmetrically, one on each side of the rotor axis.

The current leads in accordance with the invention are preferably located outside the zones subjected to high-intensity, variable magnetic fields, i.e., near or even outside the bearings 3. This avoids the generation of heat in the devices by eddy currents.

We claim:

1. A rotor for superconducting rotary machine comprising:
    (a) a superconductive winding subject to high-intensity, variable magnetic fields;
    (b) two normal conductors for conveying current to said superconductive winding;
    (c) two current leads for effecting the transfer of current between the normal conductors and the superconductive winding, each of the leads having a cold end adjacent the superconductive winding and a hot end adjacent the normal conductor; and
    (d) means for introducing a pressurized cooling fluid into the rotor and circulating it over the superconductive winding and the current leads, with the fluid passing from the cold end of said leads to the hot end, the improvement comprising:

(e) each current lead being in the form of a tube of a material which is a good conductor of heat and electricity, a mixed section of the tube extending from the cold end to the hot end thereof and having fastened to it a superconductive conductor in good thermal and electrical contact with the tube, the remainder of which constitutes a "normal" section thereof; and (f) a series of plates contained within the tube and being substantially perpendicular to the tube axis, the plates filling the tube so as to define a series of flat chambers between adjacent plates, each of which comprises a hole enabling the cooling gas to flow from the cold end of the tube to the hot end through the series of chambers, the gas passing from one chamber to the next via the hole in the plate separating the two chambers, a pressure drop occurring as the fluid passes through said hole.

2. The rotor according to claim 1, wherein each of the tubes is located outside the regions subject to the high-intensity, variable magnetic fields and in the vicinity of a bearing supporting the rotor, the tube axes being substantially parallel to the rotation axis of the rotor.

3. The rotor according to claim 2, wherein the holes in the plates are located alternately close to and distant from the rotor axis.

4. A current lead for superconducting rotary electrical machines comprising:

(a) a mixed section including a normal conductor and a superconductive conductor in thermal and electrical contact with said normal conductor;

(b) a normal section including a normal conductor continuous with the normal conductor of the mixed section;

(c) means for circulating a cooling gas through said mixed section so as to cool it to a temperature compatible with superconductivity and then over said normal section to prevent excessive transfer of heat from the normal section to the mixed section; and (d) fins for increasing the area of the lead in thermal contact with the cooling gas, the improvement wherein the device further comprises:

(e) a tube of a material which is a good conductor of heat and electricity;

(f) a superconductive conductor in good thermal and electrical contact with the tube, being fastened to the tube and extending along said tube over a tube section from a cold end of the tube to an intermediate point, said section of the tube constituting said mixed section of the device and the remaining section of the tube constituting said normal section of the device, which provides a zone of thermal transition between the intermediate point and a hot end of the tube; and (g) a series of plates contained within the tube and being substantially perpendicular to the tube axis, said plates filling the tube and defining a series of flat chambers between adjacent plates, each plate comprising a hole enabling the cooling gas to flow from the cold end of the tube to the hot end through the series of chambers with the gas passing from one chamber to the next via the hole in the plate separating the two chambers.

5. The current lead according to claim 1, wherein the area of said holes being less than 5% of the area of the plates in which they are formed.

6. The current lead according to claim 5, wherein the plates are arranged such that the holes of adjacent plates are disposed on opposite ends of the flat chamber existing between said plates.

7. The current lead according to claim 5, wherein the axial length of said chambers is less than 10% of the internal dimension of the transverse cross-section of the tube.

8. The current lead according to claim 5, wherein the thickness of the wall of said tube is greater in said mixed section than in said normal section.

* * * * *